UNITED STATES PATENT OFFICE.

MATTHEW KEENAN, OF ARMAGH WORKS, TREDEGAR ROAD, NORTH BOW, COUNTY OF MIDDLESEX, ENGLAND.

BOILER-COVERING.

SPECIFICATION forming part of Letters Patent No. 344,117, dated June 22, 1886.

Application filed June 25, 1885. Serial No. 169,904. (No specimens.) Patented in England April 16. 1885, No. 4,710.

*To all whom it may concern:*

Be it known that I, MATTHEW KEENAN, a subject of the Queen of Great Britain, residing at Armagh Works, Tredegar Road, North Bow, in the county of Middlesex, England, have invented a certain new and useful Improved Non-Conducting Composition for Protecting Boilers, Cylinders, Pipes and other Objects Against Radiation, of which the following is a specification.

In connection with my present invention I employ a compound known as "Keenan's Non-Conducting Papier Maché." This compound is made up of the following ingredients: paper-pulp, forty-five parts; burnt willow, thirty parts; loam clay, five parts; Stourbridge clay, five parts; tar, seven and one-half parts, and animal hair, seven and one-half parts. These ingredients are mixed with thirty-five parts of water, and boiled up to a temperature of about 400° Fahrenheit.

According to my present invention, I propose to strengthen and improve my above-mentioned compound, and to render the same more efficient for protecting boilers and other objects against radiation.

In carrying out my invention, I add to the above-mentioned compound and thoroughly mix and incorporate therewith a suitable quantity of pulped vegetables — such as Swedes turnips or mangel-wurzel beets, or both combined—and I mix the same with sulphate of magnesium, sulphate of lime, and a small quantity of vegetable size. The following proportions have been found suitable: thirty-five parts, by weight, of Keenan's papier-maché, twenty-five parts of pulped turnips, thirty parts of sulphate of magnesium, ten parts of sulphate of lime, and a small quantity—say, about one-half part—of vegetable size, for rendering the composition as cohesive as necessary for the varied circumstances in which it is applied.

I claim as my invention—

The non-conducting compound herein specified, consisting of paper-pulp, burnt willow, loam clay, Stourbridge clay, tar, and animal hair, mixed with water and boiled, and then combined with pulped vegetables, sulphate of magnesium, sulphate of lime, and vegetable size, in about the proportions named, and for the purposes specified.

MATTHEW KEENAN.

Witnesses:
 HERBERT E. DALE,
 WALTER JAMES S. RERTEU,
*Both of* 17 *Gracechurch Street, London, E. C.*